(12) United States Patent
Daemen et al.

(10) Patent No.: US 8,045,712 B2
(45) Date of Patent: Oct. 25, 2011

(54) STREAM CIPHERING OF THE CONTENT OF A MEMORY EXTERNAL TO A PROCESSOR

(75) Inventors: Joan Daemen, Overpelt (BE); Pierre Guillemin, Marseilles (FR); Claude Anguille, Banc Bel Air (FR); Michel Bardouillet, Rousset (FR); Pierre-Yvan Liardet, Peynier (FR); Yannick Teglia, Marseilles (FR)

(73) Assignees: STMicroelectronics S.A., Montrouge (FR); Proton World International N.V., Zaventem (BE)

( * ) Notice: Subject to any disclaimer, the term of this patent is extended or adjusted under 35 U.S.C. 154(b) by 1090 days.

(21) Appl. No.: 11/175,915

(22) Filed: Jul. 6, 2005

(65) Prior Publication Data
US 2006/0008079 A1    Jan. 12, 2006

(30) Foreign Application Priority Data

Jul. 6, 2004   (FR) ...................................... 04 51459

(51) Int. Cl.
*H04L 9/00* (2006.01)
(52) U.S. Cl. ......................... 380/264; 713/150; 713/189
(58) Field of Classification Search .................... 380/37, 380/264, 255, 259–262, 270, 274, 277, 44, 380/46; 713/150, 153, 168, 189
See application file for complete search history.

(56) References Cited

U.S. PATENT DOCUMENTS

| | | | | |
|---|---|---|---|---|
| 4,149,035 A * | 4/1979 | Frutiger | .......................... | 380/36 |
| 4,278,837 A * | 7/1981 | Best | .............................. | 713/190 |
| 4,319,079 A * | 3/1982 | Best | .............................. | 713/190 |
| 4,465,901 A * | 8/1984 | Best | .............................. | 713/190 |
| 6,021,201 A | 2/2000 | Bakhle et al. | | |
| 6,061,449 A | 5/2000 | Candelore et al. | | |
| 7,472,285 B2 * | 12/2008 | Graunke et al. | ............. | 713/193 |
| 2003/0198344 A1 | 10/2003 | Courcambeck et al. | | |
| 2004/0028224 A1 * | 2/2004 | Liardet et al. | ................... | 380/37 |
| 2004/0136529 A1 | 7/2004 | Rhelimi et al. | | |
| 2006/0253708 A1 | 11/2006 | Bardouillet et al. | | |

OTHER PUBLICATIONS

French Search Report from French Patent Application No. 04/51459, filed Jul. 6, 2004.

* cited by examiner

*Primary Examiner* — Ponnoreay Pich
*Assistant Examiner* — John B King
(74) *Attorney, Agent, or Firm* — Lisa K. Jorgenson; William R. McClellan; Wolf, Greenfield & Sacks, P.C.

(57) ABSTRACT

A method and an element of ciphering by an integrated processor of data to be stored in a memory, including applying a ciphering algorithm which is a function of a key specific to the integrated circuit and of an initialization vector, and of memorizing at least the ciphered data, the initialization vector depending at least on the address of storage of the data in the memory.

20 Claims, 2 Drawing Sheets

STREAM CIPHERING OF THE CONTENT OF A MEMORY EXTERNAL TO A PROCESSOR

BACKGROUND OF THE INVENTION

1. Field of the Invention

The present invention generally relates to the ciphering or encryption of data, of programs, or more generally of digital codes to be stored in one or several memories, external to an integrated processor in charge of exploiting these codes.

2. Discussion of the Related Art

An example of application of the present invention relates to the ciphering of executable programs downloaded by a device (computer, video or audio data reader, device provided with a microprocessor for executing downloadable programs, etc.) in which these programs are to be stored. The downloading may, for example, use the Internet. More specifically, the present invention relates to programs or data for which it is desired to prevent an unauthorized user from accessing and exploiting them.

Reference will be made hereafter to the term "data" to designate any digital code, be it executable programs or data processed by these programs.

"External to the integrated processor" means, according to the present invention, external to a so-called secure area within which is located a central processing unit communicating with the outside of this secure area over one or several buses. The memory is then connected to this or these bus(es) and is thus external to the integrated processor.

FIG. 1 illustrates, partially and very schematically, the structure of a system with a microprocessor and an external memory to which the present invention applies. A so-called secure area 1 within which is located a CPU 2 communicating via one or several buses 3 with an external memory 4 (EXT MEM) is defined. Memory 4 generally is a non-sequential (random or not) access memory. Area 1 is, for example, the microprocessor or, more generally, one or several integrated data processing circuits defining an area within which it is considered that the processed data are not likely to be pirated. In practice, secure area 1 is most often formed of a single integrated circuit chip, external memory 4 being another chip. Processor 2 is associated, in the secure area, with an internal memory 5 (INT MEM) also considered as being secure and exploits a cache memory 6 (CACHE) used as an input-output interface with bus 3.

The ciphering to which the present invention applies involves that of any data transiting on bus(es) 3, between memory 4 and central unit 2 or more generally area 1. This ciphering consists of coding the data stored by means of a key known by the integrated processor. Generally, this key is transmitted thereto by an asymmetrical ciphering process from a distant system providing the program, so that the processor stores it in a protected internal area (for example, memory 5) and uses it both to decrypt the downloaded program and/or to cipher the data in the external memory.

The present invention more specifically relates to the case of data which, when stored in the external memory, are ciphered by means of a key which depends on the integrated circuit and which is different from one chip to another, possibly after personalization. However, the ciphering is independent from the actual data in that it is not necessary to know the data preceding or following those under ciphering to be capable of performing this ciphering.

An example of a known solution to cipher the content of a memory external to a processor is described in U.S. patent application No. US-A-2003-0198344. This solution consists of dividing the data into blocks and of stream-ciphering each data block by means of a sequence combining a key specific to the integrated circuit and an initialization vector changing for each data block.

FIG. 2 very schematically illustrates such a solution in the form of blocks. This solution is based on the use of a pseudo-random generator 10 (SEGEN) providing a sequence SE of ciphering of a data block P by means of an XOR-type gate 11. Gate 11 provides a ciphered result C, that is, a block P ciphered by means of sequence SE. Sequence SE provided by generator 10 is based on an internal key K corresponding to a key specific to the microprocessor and on an initialization vector IV provided by a generator 12 (IVGEN). Generator 10 is pseudo-random in that, for a given key K, it always provides the same sequence SE for a same initialization vector IV. Magnitudes K and IV are exploited by a pseudo-random number generation algorithm (block 10) and are binary words having their sizes depending on the desired security in terms of numbers of possible combinations. Sequence SE is a binary word having its size depending on the size of the blocks to be ciphered. The flow of data blocks C is stored in memory 4 (MEM). Initialization vector IV generated by generator 12 is stored in memory 4 at the same time as encrypted block C (CRYPT DATA) coming from gate 11, to be able to associate, with each stored block, an initialization vector specific thereto. What has been described hereabove corresponds to a phase of writing (high portion of FIG. 2, WRITE) into memory 4 (MEM).

To decipher (low portion of FIG. 2, READ) data read from memory 4, the same pseudo-random generator 10 of sequences SE and the same XOR gate 11 are used. Generator 10 receives on the one hand key K internal to the integrated circuit (processor) and on the other hand the initialization vector IV corresponding to block C to be deciphered, read from memory 4.

A solution such as illustrated in FIG. 2 corresponds to a solution described in the above-mentioned U.S. patent and enables the ciphered data to be ciphered by a key specific to the integrated circuit chip processing them.

A first problem of conventional solutions of the type described in this patent application is linked to the need for storage of the initialization vectors. Such a storage is space-consuming (be it external or internal to circuit 1).

Another problem is linked to the so-called risk of collision with the method used to generate initialization vectors IV of sequence generator SE. Indeed, the probability to be in the presence of two identical initialization vectors is a function of the size of word IV generated by generator 12. However, increasing the length of the random sequence increases the circuit cost. In fact, for a same ciphering algorithm (block 10), the security of the ciphering is then dependent on the size of the initialization vector.

SUMMARY OF THE INVENTION

The present invention more specifically applies to a stream cipher, that is, of the type illustrated in FIG. 2 in which a ciphering sequence (SE) independent from the data is generated to mask them by a combination (generally, XOR).

It could have been devised to replace the random generator (12, FIG. 2) of the initialization vector by a so-called counter mode generation, which consists of generating the initialization vector by means of a counter. Such a generation enables decreasing the collision probability. For example, with a random generator over 32 bits, the collision probability is 0.6 for 65,536 drawings while with a counter over 32 bits, the collision appears after 232 counter writings.

However, the use of a counter to generate the initialization vectors does not enable avoiding the need for storing the initialization vector since the memory is with a direct access (non sequential).

The present invention aims at overcoming the disadvantages of known methods for ciphering the content of a memory external to a processor by means of a key specific to the processor or to the integrated circuit.

The present invention especially aims at providing a solution which is compatible with a stream ciphering of the data to be stored in the memory.

To achieve these and other objects, the present invention provides a method of ciphering by an integrated processor of data to be stored in a memory, comprising applying a ciphering algorithm which is a function of at least one key specific to the integrated circuit and of an initialization vector, and of memorizing at least the ciphered data, the initialization vector depending at least on the address of storage of the data in the memory.

According to an embodiment of the present invention, the initialization vector is a function taking into account the address and a differentiation value.

According to an embodiment of the present invention, the initialization vector corresponds to the concatenation of the storage address and of the differentiation value.

According to an embodiment of the present invention, the differentiation value is provided by at least one counter incremented or decremented on each writing at a same address.

According to an embodiment of the present invention, the memory is divided at least into sections in which each data word is addressable by an index, the ciphering algorithm taking into account both the section address and the word index.

According to an embodiment of the present invention, the memory is divided into regions, each containing several sections, a separate counter being assigned at least to each region of the memory.

According to an embodiment of the present invention, a separate counter is assigned at least to each section of the memory.

According to an embodiment of the present invention, the ciphering algorithm provides a sequence of stream ciphering of data to be written into the memory.

The present invention also provides a method for deciphering ciphered data, comprising applying an algorithm identical to the ciphering algorithm, an initialization vector being obtained based on at least the address of the ciphered data.

The present invention also provides an electronic assembly, for example, a smart card, comprising at least one memory external to an integrated circuit provided with a processor, comprising means for ciphering data to be written into the memory, a differentiation value being stored with each ciphered word in the memory.

The foregoing and other objects, features, and advantages of the present invention will be discussed in detail in the following non-limiting description of specific embodiments in connection with the accompanying drawings.

DETAILED DESCRIPTION

Figure 1:
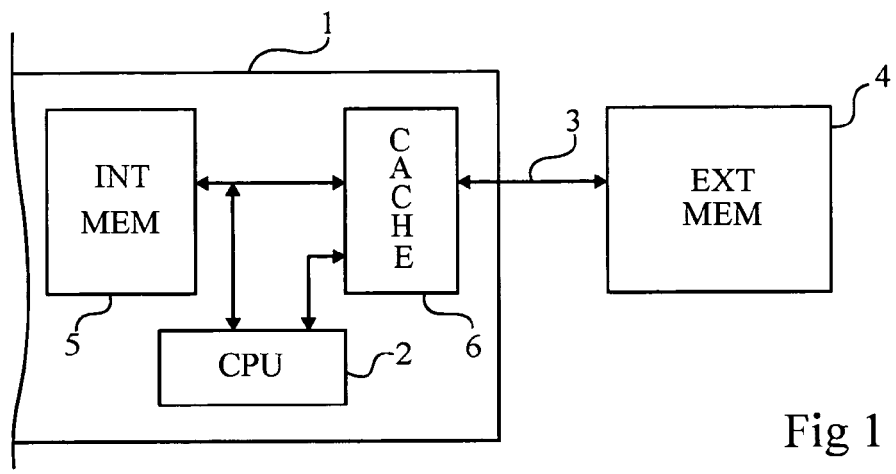
FIGS. 1 and 2, previously described, are intended to show the state of the art and the problem to solve.

The same elements have been designated with the same reference numerals in the different drawings. For clarity, only those elements and steps which are necessary to the understanding of the present invention have been shown in the drawings and will be described hereafter. In particular, the ciphering algorithm based on the key internal to the circuit has not been described in detail; the present invention being compatible with any conventional algorithm (for example, a linear shift feedback register—LSFR—based algorithm, AES and DES algorithms in feedback mode—OFB, SHA-1 algorithm with key).

A feature of the present invention is to make the initialization vector used for the ciphering dependent on the address at which a data word must be stored in the memory. Thus, the storage of this initialization vector is simplified, the address of the data word in the memory being known.

Preferably, the initialization vector does not exactly correspond to the address of each data word in the memory, but the memory is divided into sections, each comprising several words or blocks. Each section then has an address A and each word position in a section has an index I. Knowing the address and the index, it is possible to locate the data block (the word) in the memory.

Figure 2:
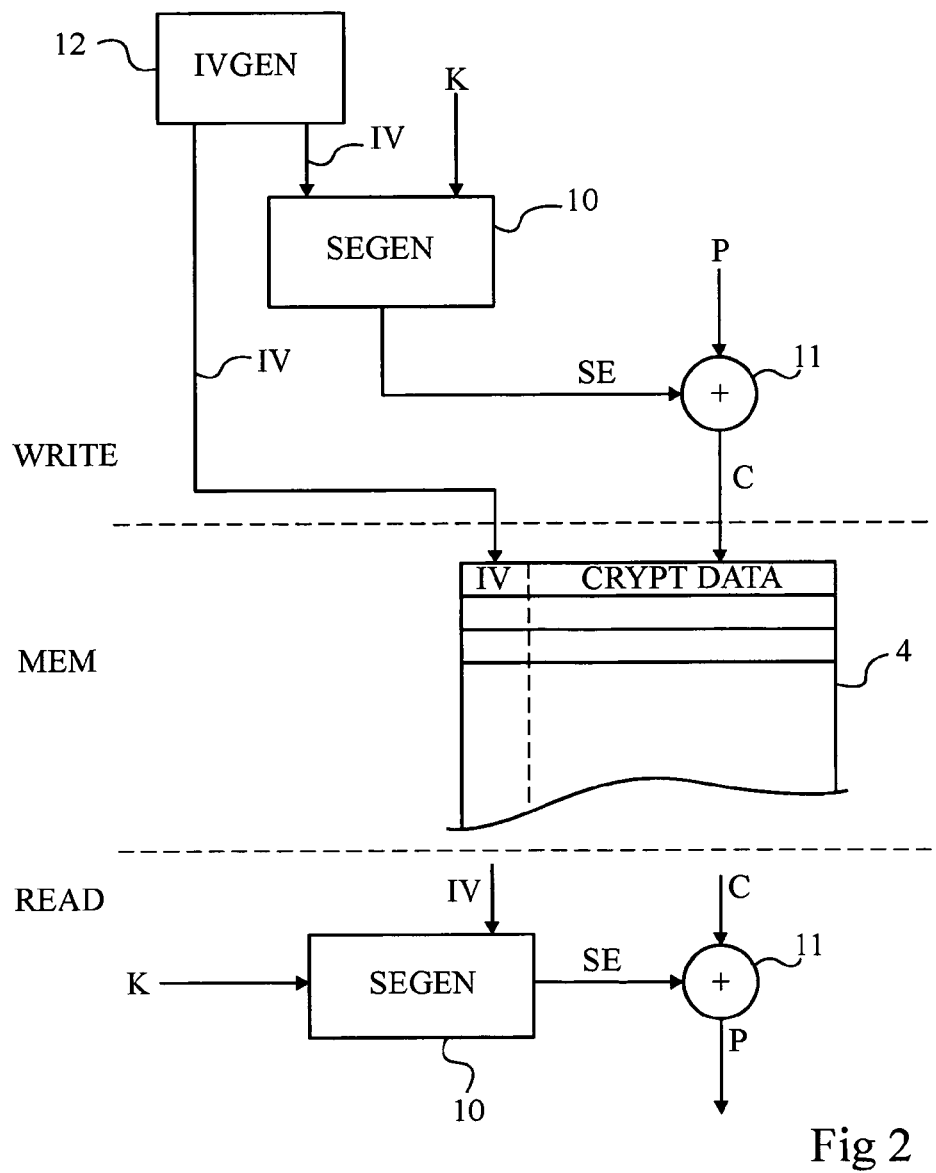
Figure 3:
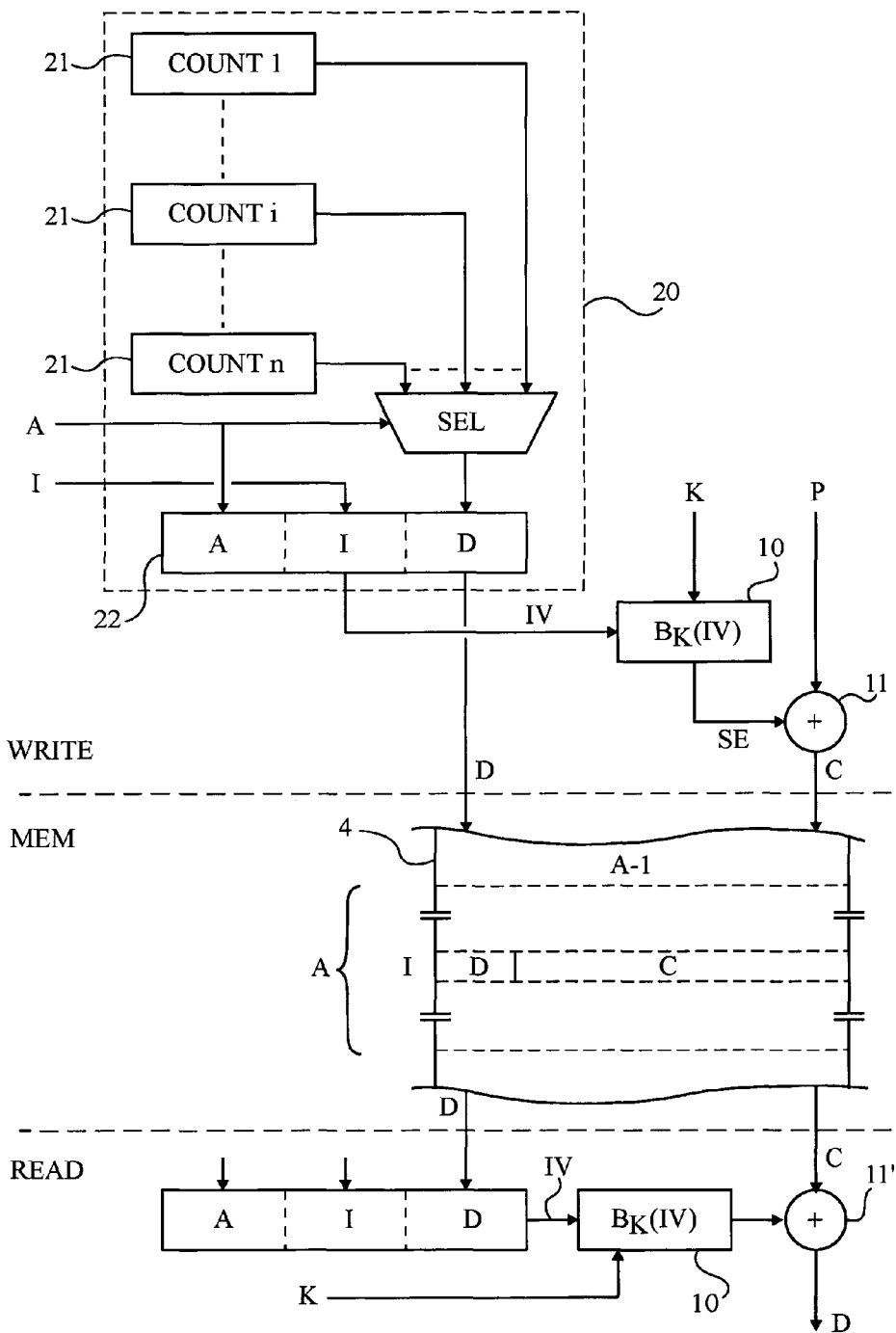
FIG. 3 illustrates an embodiment of the present invention.

FIG. 3 very schematically illustrates an embodiment of the method according to the present invention. This drawing shows, in the form of blocks, the elements or functions of the ciphering circuit of an integrated processor and should be compared with the representation of FIG. 2. The practical implementation of this ciphering circuit may be either a hardware implementation (wired logic) or a software implementation (program executed by the integrated processor).

As previously, a block 10 of ciphering, for example, by blocks ($B_K(IV)$), generates a sequence SE for stream-ciphering a data word P to be ciphered. Sequence SE is combined with data P by means of an XOR gate 11. Block 10 may comprise any conventional function SEGEN for generating sequence SE, a block ciphering function $B_K(IV)$ being an example.

Gate 11 provides a ciphered result C, that is, a word P ciphered by means of sequence SE. Sequence SE provided by generator 10 is based on an internal key K corresponding to a key specific to a microprocessor and on an initialization vector IV provided by a generator 20. Magnitudes K and IV are exploited, for example, by a symmetrical block-ciphering algorithm, for example, of DES or AES type, and are binary words having their sizes depending on the desired security. Sequence SE is a binary word having its size depending on the size of words P to be ciphered.

According to the present invention, initialization vector IV is obtained by application of a function with several binary values comprising at least a value depending on address A where data C must be written into the memory and at least one differentiation value D having the feature of being different on each writing at the same address. Preferably, value D is provided by a counter 21 incremented on each writing. As an alternative, value D is provided by a random generator.

Preferably, the applied function is a simple concatenation of the values. The result then is in a register 22 that contains initialization vector IV for the concerned address. The order of the concatenation however is of no importance.

In the embodiment illustrated in FIG. 3, several (n) counters 21 (COUNT1, ..., COUNTi, ..., COUNTn) are used, each counter being assigned to an address A. Here, addresses A are, for example, addresses of sections of memory 4 each containing several words locatable by an index I. The counter providing differentiation value D is then selected (selector 23—SEL) according to section address A. As an alternative, the counter is incremented only if the address of the memory section which is written into is smaller than or equal to the address of the previously-written section.

In a simplified embodiment, address A of the section represents the most significant bits (MSB) of the complete address and index I represents the least significant bits (LSB) of the complete address. As an alternative, any combination function may be used.

Word flow C is stored in memory 4 (MEM). According to the present invention, only differentiation value D is stored in memory 4 at the same time as word C provided by gate 11. Accordingly, the memory bulk linked to the storage of values enabling associating, with each stored block, an initialization vector which is specific thereto, is considerably reduced.

What has been described hereabove corresponds to a phase of writing (high portion of FIG. 3, WRITE) into memory 4 (MEM).

To decipher (low portion of FIG. 3, READ) data C read from memory 4, a block 10 ($B_K(IV)$) performing the same function as block 10 used for the ciphering is used. Deciphering block 10 receives on the one hand key K internal to the integrated circuit (processor), and on the other hand initialization vector IV restored by concatenation of address A, of index I known by the processor, and of value D read from memory 4 with data C.

It should be noted that, as in the conventional case of FIG. 2, the ciphering function and its inverse are often the same (especially for the XOR case).

The ciphering amounts to applying, to each data word (block) P, the following formula:

$$C = P + B_K(D/A/I),$$

where symbol + designates a bit-to-bit addition (bit-to-bit XOR) while symbol / designates a concatenation of the words (here, a concatenation of words D, A, and I, instead of A, I, and D in FIG. 3). As an alternative, block 10 is a pseudo-random generator having as germs value IV and key K.

For the deciphering, the original data are obtained by applying the following relation:

$$P = C + B_K(D/A/I).$$

An advantage of the present invention is that only the value of counter D (or of the random generator) needs be written into the memory with ciphered data C. However, conversely to an operation in conventional counter mode, the counter value is here combined with the address of storage in the memory, which reduces risks of collisions for a same counter size.

It can be seen that whether several counters have the same values matters little, since the complete initialization vector will be differentiated by the address.

Another advantage of the present invention is, according to its preferred embodiment in which address A is a section address instead of being a word address, that the ciphering is further improved, without it being necessary to take up more space in the memory.

According to an alternative embodiment, one or several additional divisions may be provided in the memory. For example, a region code R is assigned to subsets of the memory gathering several sections locatable by their address A. In this case, the complete ciphering function becomes, for example:

$$C = P + B_K(D/R/A/I).$$

Such an embodiment enables using one counter per region, common to all the sections in the region. The counter number is thus decreased with respect to the embodiment providing one counter per section.

Preferably, the nature of the counters and especially of the element storing their value in the secure area is the same as the nature of the external memory in which differentiators D are stored. For example, if the external memory is a non-volatile memory, at least the key, and preferably the counter values, are stored in the secure area in non-volatile memory elements. If the external memory is a volatile memory (RAM, for example), the counters and the key may be stored in volatile registers of the secure area.

According to another alternative embodiment, a counter is assigned to each region, in addition to the counter assigned to each section.

According to another alternative, each section and/or region counter is combined with a value provided by a general counter.

All the above alternatives aim at further decreasing collision risks at the cost of slight modifications of the circuit and of a slight complexity of the calculations.

It should be noted that the present invention is compatible with any conventional method for providing a key to an integrated processor, where the present invention does not take part in the generation of this key, but only exploits it to cipher the data to be stored in the external memory. In particular, several keys may be used within a same circuit and be selected, for example, according to the application or to the user. Similarly, the key(s) may be provided to the integrated circuit by any conventional method (public key system, inscription on manufacturing, random generation on powering on, etc.).

Examples of ciphering algorithms that may be used for the implementation of the present invention are described in the following publications, their possible adaptation being within the abilities of those skilled in the art based on the functional indications given hereabove:

FIPS PUB 46-3, Data Encryption Standard (DES), 1999;

FIPS PUB 180-1, Secure Hash Standard 1995;

FIPS PUB 197, Advanced Encryption Standard (AES), 2001.

Of course, the present invention is likely to have various alterations, modifications, and improvements which will readily occur to those skilled in the art. In particular, the practical implementation of the present invention by a hardware or software implementation is within the abilities of those skilled in the art based on the functional indications given hereabove. Further, other ciphering algorithms than those indicated in the present description as an example may be used. Further, the selection of the counter sizes is within the abilities of those skilled in the art according to the desired collision probability.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of ciphering by an integrated processor of data to be stored in a memory, comprising applying a ciphering algorithm, which is a function of at least one key specific to the integrated circuit and of an initialization vector, to obtain ciphered data, wherein the initialization vector includes at least an address of storage of the ciphered data in the memory and a differentiation value associated with the address of storage, the differentiation value having a different value on each writing at a same address of storage in the memory, wherein the differentiation value is provided by at least one counter incremented or decremented on each writing at a same address, the ciphering algorithm being a function of the address of storage and the differentiation value, and storing at least the ciphered data and the differentiation value in the memory at the address of storage, only the differentiation value of the initialization vector being stored with the ciphered data in the memory at the address of storage.

2. The method of claim 1, wherein the initialization vector corresponds to the concatenation of the storage address and of the differentiation value.

3. The method of claim 1, wherein the memory is divided at least into sections in which each data word is addressable by an index, the ciphering algorithm taking into account both the section address and the word index.

4. The method of claim 1, wherein the memory is divided into regions, each containing several sections, a separate counter being assigned at least to each region of the memory.

5. The method of claim 1, wherein the memory is divided at least into sections in which each data word is addressable by an index, the ciphering algorithm taking into account both the section address and the word index, and wherein a separate counter is assigned at least to each section of the memory.

6. The method of claim 1, wherein the ciphering algorithm provides a sequence of stream ciphering of data to be written into the memory.

7. A method for deciphering data ciphered by implementation of the method of claim 1, comprising applying an algorithm identical to the ciphering algorithm, an initialization vector being obtained based on at least the address of the ciphered data.

8. An electronic assembly comprising at least one memory external to an integrated circuit provided with a processor, comprising means for applying a ciphering algorithm, which is a function of at least one key specific to the integrated circuit and of an initialization vector, to obtain ciphered data, wherein the initialization vector includes at least an address of storage of the ciphered data in the memory and a differentiation value associated with the address of storage, the differentiation value having a different value on each writing at a same address of storage in the memory, wherein the differentiation value is provided by at least one counter incremented or decremented on each writing at a same address, the ciphering algorithm being a function of the address of storage and the differentiation value, and means for storing at least the ciphered data and the differentiation value in the memory at the address of storage, only the differentiation value of the initialization vector being stored with the ciphered data in the memory at the address of storage.

9. A smart card, comprising the assembly of claim 8.

10. The electronic assembly of claim 8, wherein the memory is divided at least into sections in which each data word is addressable by an index, and wherein the initialization vector is a concatenation of a section address, a word index and the differentiation value.

11. The electronic assembly of claim 8, wherein the memory is divided at least into sections in which each data word is addressable by an index, and wherein a separate counter is assigned at least to each section of the memory.

12. The electronic assembly of claim 8, wherein the memory is divided into regions, each containing several sections, and wherein a separate counter is assigned at least to each region of the memory.

13. An electronic assembly comprising a memory and a processor, the processor being configured to:
apply a ciphering algorithm to data to obtain ciphered data, the ciphering algorithm having as parameters a key associated with the processor and an initialization vector which includes as components at least a storage address in the memory and a differentiation value having a different value on each writing at a same storage address in the memory, wherein the differentiation value is provided by at least one counter incremented or decremented on each writing at the storage address and wherein the ciphering algorithm is a function of the storage address and differentiation value components of the initialization vector; and
store the ciphered data and the differentiation value at the storage address in the memory, only the differentiation value component of the initialization vector being stored with the ciphered data in the memory at the storage address.

14. The electronic assembly of claim 13, wherein the memory is divided at least into sections in which each data word is addressable by an index, and wherein the initialization vector is a concatenation of a section address, a word index and the differentiation value.

15. The electronic assembly of claim 13, wherein the memory is divided into sections in which each data word is addressable by an index, and wherein the differentiation value is provided by a counter assigned to a section of the memory in which the ciphered data is stored.

16. The electronic assembly of claim 13, wherein the memory is divided into regions, each region containing several sections, and wherein the differentiation value is provided by a counter assigned to a region of the memory in which the ciphered data is stored.

17. A method for ciphering data using at least one processor, comprising:
generating an initialization vector which includes as components at least a storage address in a memory and a differentiation value having a different value on each writing at a same storage address in the memory;
applying a ciphering algorithm to the data to obtain ciphered data, the ciphering algorithm having as parameters the storage address and the differentiation value of the initialization vector and a key associated with the at least one processor, wherein the differentiation value is provided by at least one counter incremented or decremented on each writing at the storage address and wherein the ciphering algorithm is a function of the storage address and differentiation value components of the initialization vector; and
storing the ciphered data and the differentiation value at the storage address, only the differentiation value component of the initialization vector being stored with the ciphered data in the memory at the storage address.

18. The method of claim 15, wherein the memory is divided into a plurality of sections and the ciphered data is addressable in the memory using a section address and a word index, and wherein the initialization vector is generated based at least in part on the section address and the word index.

19. The method of claim 15, wherein the memory is divided into a plurality of regions, each containing a plurality of sections, and wherein a separate differentiation value is used for each region of the memory.

20. A method for deciphering ciphered data stored at storage address in a memory, comprising:
generating an initialization vector which includes as components at least the storage address and a differentiation value stored at the storage address, the differentiation value having a different value on each writing at a same storage address in the memory, only the differentiation value component of the initialization vector being stored with the ciphered data in the memory at the storage address, wherein the differentiation value is provided by at least one counter incremented or decremented on each writing at the storage address; and using at least one processor to apply a deciphering algorithm to the ciphered data, the deciphering algorithm being a function of the storage address and differentiation value components of the initialization vector and a key associated with the at least one processor.

* * * * *